United States Patent [19]

Harris

[11] Patent Number: 5,786,083
[45] Date of Patent: Jul. 28, 1998

[54] FLOOR MAT AND YARN THEREFOR

[75] Inventor: Francis Taylor Harris, Cleveland, Tenn.

[73] Assignee: Turtle Plastics, Inc., Lorain, Ohio

[21] Appl. No.: 760,049

[22] Filed: Dec. 4, 1996

[51] Int. Cl.$^6$ ............................ D02G 3/00; D02G 3/02; D02G 3/06
[52] U.S. Cl. .................. 428/373; 428/90; 428/91; 428/92; 428/364; 428/377; 428/394; 57/210; 57/243; 57/244; 57/224; 57/227
[58] Field of Search ...................... 428/364, 377, 428/394, 373, 374, 90, 91, 92; 57/210, 243, 244, 224, 227

[56] References Cited

U.S. PATENT DOCUMENTS

| | | |
|---|---|---|
| 2,971,322 | 2/1961 | Bouvet . |
| 3,217,482 | 11/1965 | Baer . |
| 3,264,816 | 8/1966 | Jäggi . |
| 3,413,697 | 12/1968 | Agett et al. . |
| 3,438,193 | 4/1969 | Kosada et al. . |
| 3,460,336 | 8/1969 | Collingwood et al. . |
| 3,675,409 | 7/1972 | Rosenstein ........................ 57/144 |
| 3,769,787 | 11/1973 | Rosenstein et al. ............... 57/144 |
| 3,940,917 | 3/1976 | Strachan . |
| 3,950,932 | 4/1976 | Durling . |
| 4,343,146 | 8/1982 | Nelson . |
| 4,346,553 | 8/1982 | Schwartz ......................... 57/210 |
| 4,408,446 | 10/1983 | Wilkie . |
| 4,711,191 | 12/1987 | Schwartz ......................... 57/228 |
| 4,934,134 | 6/1990 | Niederer . |
| 5,035,110 | 7/1991 | Nelson . |
| 5,417,046 | 5/1995 | Setzer . |

FOREIGN PATENT DOCUMENTS 5221442   8/1975   Japan .

*Primary Examiner*—Marion E. McCamish
*Assistant Examiner*—J. M. Gray
*Attorney, Agent, or Firm*—Renner, Otto, Boisselle & Sklar, P.L.L.

[57] ABSTRACT

A floor mat has tufts made of a yarn which is formed with a monofilament core around which a multifilament yarn is air entangled. The resulting yarn is sufficiently stiff to clean dirt off of the shoes of passers by, yet is easily cleaned. The monofilament core is a polypropylene between 600 and 1200 denier, preferably about 1095 denier. The multifilament yarns entangled around the core are also polypropylene and total about 160 filaments and about 4800 denier. The air entangling is accomplished using higher than normal air pressure (i.e., about 110 p.s.i.).

8 Claims, 1 Drawing Sheet

5,786,083

FLOOR MAT AND YARN THEREFOR

FIELD OF THE INVENTION

The present invention relates to floor mats and to yarns suitable for the manufacture of floor mats.

BACKGROUND OF THE INVENTION

Floor mats play a unique role in the carpet industry. The purpose of a floor mat includes capturing dirt from the shoes of those who cross over the mat. Typically floor mats are used at the entrances of buildings and at transitions between dirtier and cleaner environments within buildings. Floor mats must have the ability to capture and retain dirt, while at the same time they must be cleanable.

One yarn which has been used to make floor mats is disclosed in U.S. Pat. No. 4,711,191. This yarn is formed of a group of heavy denier thermoplastic monofilaments which are wrapped with a flexible wrapper yarn and then crimped within a conventional crimper. The resulting yarn produces a floor mat which is very aggressive in retaining dirt from the shoes of people passing over it, but such floor mats are also exceedingly difficult to clean. The crimps in the yarn produce VELCRO-like hooks which retain dirt and foreign material, especially stray yarns and threads.

SUMMARY OF THE INVENTION

The present invention provides a yarn for making a floor mat and the resulting floor mat which is suitably stiff to extract dirt from the shoes of those walking over it, and yet is easily cleanable. The floor mat has a semi-stiff, pliable surface suitable for cleaning foot traffic.

The yarn for making this fabric includes a first yarn which is a monofilament of between 600 and 1200 denier. This core may be made of polypropylene which is extruded with a low elongation and high tenacity, making it relatively stiff.

The polypropylene first yarn is surrounded by one or more bulked continuous filament (BCF) yarn(s). These yarns are multifilament and made of polypropylene, and the denier per fiber (DPF) is in the range of approximately 30-50. Thus, the total bundle of each BCF multifilament yarn has a denier of between approximately 2400/80 and 2400/48. The BCF multifilament yarn(s) is/are textured, and preferably include(s) a high ultraviolet stabilizer.

The fiber of the present invention is made by mounting one or more BCF multifilament yarns on a creel together with the monofilament first yarn. The creel wraps the BCF multifilament yarns around the first yarn, and this group is then fed to an air entangler operating at higher than normal air pressure. The finished yarn is removed from the air entangler and wound on a take-up winder. Where two BCF multifilament yarns are used, the finished product has a total denier of in the range of 5400/161 to 6000/161.

The resulting floor mat is free of the VELCRO effect which made prior art floor mats overly aggressive and it can be manufactured using conventional methods.

DESCRIPTION OF PREFERRED EMBODIMENTS

Figure 1:
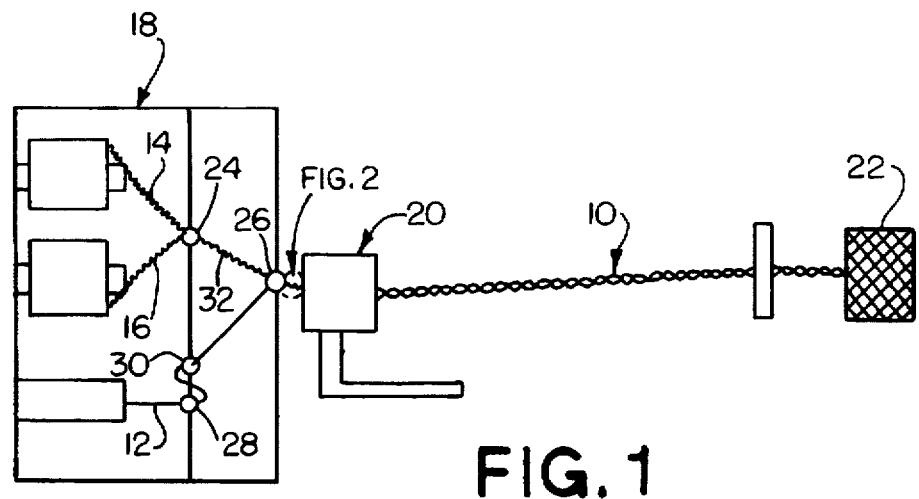
FIG. 1 is a schematic illustration showing the manufacture of a yarn according to the present invention.

A yarn 10 constructed in accordance with the present invention is illustrated in FIG. 1. The yarn 10 is formed a monofilament first yarn 12 around which are entangled a pair of BCF multifilament yarns 14 and 16. The first yarn 12 and BCF multifilament yarns 14 and 16 are wrapped around each other in a creel 18, and then fed to an air entangler 20. The resulting yarn is wound on a take-up winder 22.

The monofilament first yarn 12 is formed of polypropylene. The first yarn 12 has a denier per filament (DPF) of between 600 and 1200, and preferably about 1095. As a result the average diameter of the first yarn is about 16.5 mils. And within the range of about 12 to 20 mils. The first yarn 12 is extruded with a low elongation (in the range of 24%±4%) and a high tenacity (in the range of 5.3±0.50 grams per denier ). As a result the first yarn 12 is stiff. The monofilament first yarn 12 is a nontextured yarn.

The BCF multifilament yarns 12 and 14 are identical. Each of the yarns 14 and 16 is a multifilament yarn made of polypropylene. The denier of each filament is in the range of approximately 30 to 48 DPF while the total bundle denier is 2400. The resulting denier is thus in the range of approximately 2400/50 to 2400/80. The yarns 14 and 16 are textured and have a high ultraviolet stabilizer in them.

Figure 2:
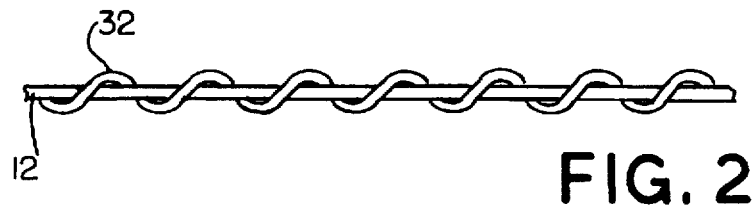
FIG. 2 is a simplified illustration of a yarn in the process of being manufactured in accordance with the present invention schematically illustrating the false twist of multifilament yarn around a monofilament yarn.

The creel 18 is a tufting creel in which ceramic eyelets 24, 26, 28 and 30 have replaced the traditional tubes. The eyelets which have proved satisfactory have one quarter inch I.D. openings through which the yarns 12, 14, and 16 pass. The two BCF multifilament yarns 14 and 16 are payed off in a counterclockwise direction and then fed through an eyelet 24 where the filaments of the two yarns commingle, creating a sort of false twist which joins them together in a commingled pair 32. This commingled pair 32 is subsequently fed through an eyelet 26 with the monofilament 12 where the multifilaments 14 and 16 partially wrap around the monofilament 12 as shown in FIG. 2. The twist of the combined BCF yarns 14 and 16 and the monofilament yarn 12 is about 0.33 turns per inch.

The monofilament first yarn 12 is payed off in a counter clockwise direction and fed through two eyelets, 28 and 30, in succession. Thereafter the monofilament 12 joins the two BCF yarns in the eyelet 26. Running the monofilament 12 through the two eyelets 28 and 30 has proven to provide sufficient drag on the monofilament to keep it from kinking and to allow the subsequent processing in the air entangler 20 to be successfully accomplished.

Figure 3:
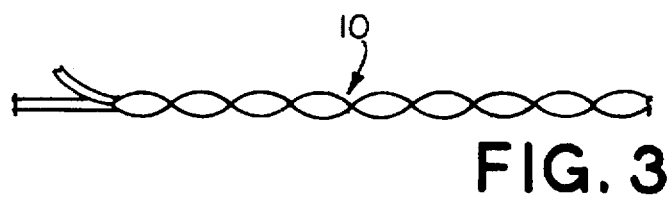
FIG. 3 is a schematic illustration of the yarn of FIG. 2 after the manufacturing process is complete.

After the first yarn 12 wrapped with BCF multifilaments 32 exits the creel 18, it enters an air entangler or air tac jet 20 which is of conventional construction. Usually an air tac jet is run with an air supply at about 50 p.s.i. In accordance with the present invention, the air tac jet 20 is run at least twice that, and preferably with air at about 110 p.s.i. The resulting yarn 10 (shown in FIG. 3) has air tacs approximately 2 inches apart along its entire length. After being fed through the air tac jet, the yarn 10 is fed to the take-up winder 22.

Figure 4:
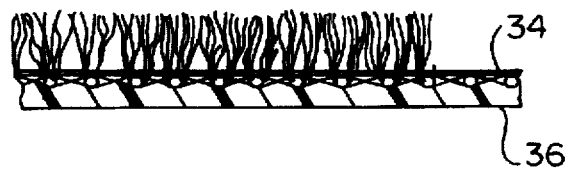
FIG. 4 is a schematic illustration of a floor mat made of yarn constructed in accordance with the present invention.

The finished yarn 10 is suitable for the manufacture of floor mats. The yarn 10 may be tufted to a primary backing 34 (FIG. 4), and thereafter a secondary backing 36 is then attached. The secondary backing 36 may be, for example, vinyl which finishes the mat and locks the tuft rows so they can't be pulled out during use.

What is claimed is:

1. A floor mat yarn comprised of a first yarn which is a monofilament of between 600 and 1200 denier and a second yarn which is a multifilament yarn of between about 30 and about 48 denier per fiber, the second yarn being air entangled with the first yarn.

2. The yarn of claim 1 wherein the first yarn is polypropylene.

3. The yarn of claim 2 wherein the second yarn is polypropylene.

4. The yarn of claim 3 wherein the second yarn is composed of multifilament yarns each of between 2400/50 and 2400/80 denier.

5. A floor mat including tufting formed of the yarn of claim 1.

6. A floor mat including tufting formed of the yarn of claim 2.

7. A floor mat including tufting formed of the yarn of claim 3.

8. A floor mat including tufting formed of the yarn of claim 4.

* * * * *